United States Patent
Archer et al.

(10) Patent No.: US 10,267,181 B2
(45) Date of Patent: Apr. 23, 2019

(54) TURBOMACHINE WITH AXIAL STOP MEMBER

(71) Applicant: Cummins Ltd, Huddersfield (GB)

(72) Inventors: Jamie Archer, Holmfirth (GB); Mark Holden, Wakefield (GB)

(73) Assignee: Cummins Ltd., Huddersfield (GB)

( * ) Notice: Subject to any disclaimer, the term of this patent is extended or adjusted under 35 U.S.C. 154(b) by 644 days.

(21) Appl. No.: 14/787,695

(22) PCT Filed: Apr. 28, 2014

(86) PCT No.: PCT/GB2014/051313
§ 371 (c)(1),
(2) Date: Oct. 28, 2015

(87) PCT Pub. No.: WO2014/177848
PCT Pub. Date: Nov. 6, 2014

(65) Prior Publication Data
US 2016/0177784 A1    Jun. 23, 2016

(30) Foreign Application Priority Data

Apr. 29, 2013  (GB) .................................. 1307674.0

(51) Int. Cl.
*F01D 25/16* (2006.01)
*F01D 5/02* (2006.01)
(Continued)

(52) U.S. Cl.
CPC ............. *F01D 25/162* (2013.01); *F01D 5/02* (2013.01); *F01D 25/16* (2013.01); *F01D 25/183* (2013.01);
(Continued)

(58) Field of Classification Search
CPC ............. F05D 2240/50; F05D 2240/52; F05D 2240/54; F05D 2240/70; F05D 2260/30;
(Continued)

(56) References Cited

U.S. PATENT DOCUMENTS 4,557,679 A * 12/1985 Mori ...................... F01C 21/02
384/542
4,645,213 A * 2/1987 Washimi ................ F16J 15/406
277/347
(Continued)

FOREIGN PATENT DOCUMENTS

CN     101014753 A    8/2007
CN     102003228 A    4/2011
(Continued)

OTHER PUBLICATIONS

International Search Report dated Jul. 18, 2014 in corresponding International Application No. PCT/GB14/051313.
(Continued)

*Primary Examiner* — Jason D Shanske
*Assistant Examiner* — Joshua R Beebe
(74) *Attorney, Agent, or Firm* — Faegre Baker Daniels LLP

(57) ABSTRACT

A turbomachine having an axial stop member arranged to restrain axial movement of a bearing assembly of the turbomachine, the axial stop member having a bore defined by a radially inner surface of the axial stop member which forms a close radial fit with a shaft of the turbomachine, or a member mounted on the shaft to rotate with the shaft, an anti-rotation formation engageable with a complimentary formation provided on an outer race of the bearing assembly so as to rotationally fix the outer race relative to the axial stop member and wherein the axial stop member further comprises a lubricating fluid directing member and a lubri-
(Continued)

cating fluid outlet, the lubricating fluid directing member being arranged to receive lubricating fluid that is flung radially outward from said axis, due to the rotation of the shaft, and to direct the lubricating fluid to the lubricating fluid outlet.

20 Claims, 4 Drawing Sheets

(51) Int. Cl.
> *F01D 25/18* (2006.01)
> *F01D 25/20* (2006.01)
> *F01D 25/24* (2006.01)
> *F02B 33/40* (2006.01)
> *F04D 29/28* (2006.01)
> *F16C 35/067* (2006.01)
> *F16C 19/18* (2006.01)

(52) U.S. Cl.
> CPC ............. *F01D 25/20* (2013.01); *F01D 25/24* (2013.01); *F02B 33/40* (2013.01); *F04D 29/284* (2013.01); *F16C 35/067* (2013.01); *F05D 2220/40* (2013.01); *F05D 2240/50* (2013.01); *F05D 2260/30* (2013.01); *F05D 2260/98* (2013.01); *F16C 19/184* (2013.01); *F16C 2226/50* (2013.01); *F16C 2360/24* (2013.01)

(58) Field of Classification Search
> CPC .. F05D 2260/98; F05D 2220/40; F01D 25/16; F01D 25/162; F01D 25/168; F01D 25/18; F01D 25/183; F01D 5/02; F01D 25/20; F01D 25/24; F04D 29/056; F04D 29/059; F02C 7/06; F16C 17/10; F16C 17/04; F16C 17/08; F16C 21/00; F16C 35/06; F16C 35/067; F16C 35/077; F16C 33/3806; F16C 33/66; F16C 33/6685; F16C 19/184; F16C 2226/50; F16C 2360/24; F02B 33/40
> See application file for complete search history.

(56) References Cited

U.S. PATENT DOCUMENTS

| | | | | |
|---|---|---|---|---|
| 4,655,043 A | * | 4/1987 | McInerney | F01D 17/08 60/602 |
| 4,664,605 A | * | 5/1987 | Asano | F01D 25/183 417/407 |
| 4,721,441 A | * | 1/1988 | Miyashita | F01D 25/164 384/518 |
| 4,838,711 A | * | 6/1989 | Munkel | F01D 25/164 384/215 |
| 5,207,566 A | * | 5/1993 | Munkel | F01D 25/164 417/407 |
| 6,129,455 A | * | 10/2000 | Galante | B21K 25/00 29/898.062 |
| 7,371,011 B2 | * | 5/2008 | McKeirnan, Jr. | F01D 25/16 384/504 |
| 2010/0037855 A1 | * | 2/2010 | French | F01D 25/16 123/323 |
| 2011/0052429 A1 | * | 3/2011 | Marsal | F01D 25/162 417/407 |
| 2012/0045326 A1 | | 2/2012 | House et al. | |

FOREIGN PATENT DOCUMENTS

| | | |
|---|---|---|
| EP | 2 154 348 | 2/2010 |
| WO | 92/20904 | 11/1992 |

OTHER PUBLICATIONS

Examination Report dated Sep. 23, 2016, issued by the State Intellectual Property Office of the People's Republic of China for related Application No. 2014800369993; 12 pages.

Examination Report dated Sep. 23, 2016, issued by the State Intellectual Property Office of the People's Republic of China (translated in English language) for related Application No. 2014800369993; 5 pages.

* cited by examiner

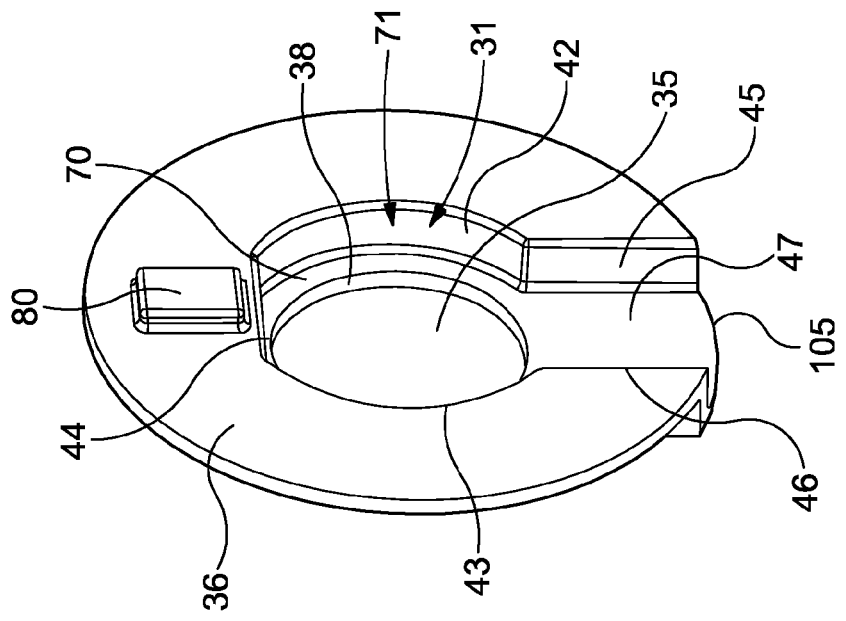
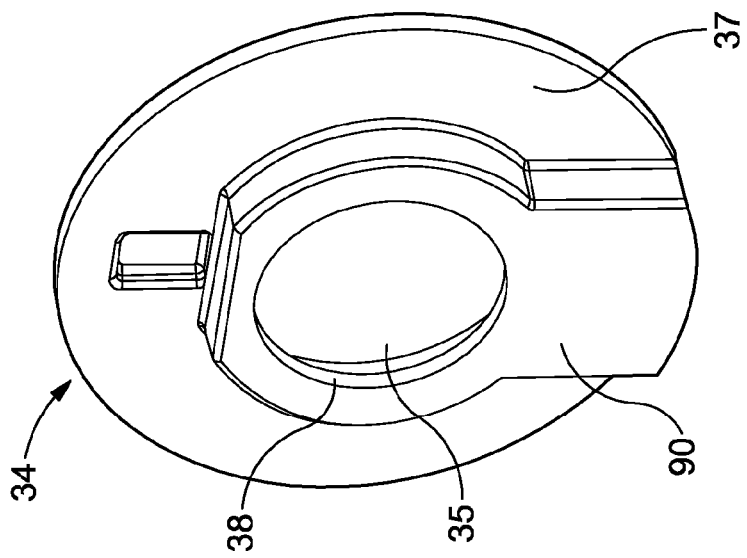

TURBOMACHINE WITH AXIAL STOP MEMBER

RELATED APPLICATIONS

The present application is a National Stage of PCT Application S/N PCT/GB2014/051313, filed Apr. 28, 2014 which claims priority to United Kingdom Application S/N 1307674.0, filed Apr. 29, 2013, the disclosures of which being both expressly incorporated herein by reference.

FIELD OF THE DISCLOSURE

The present disclosure relates to a turbomachine and has particular, but not exclusive, application to a turbomachine in the form of a turbocharger or a power turbine.

BACKGROUND

Turbochargers are well known devices for supplying air to the intake of an internal combustion engine at pressures above atmospheric (boost pressures). A conventional turbocharger essentially comprises an exhaust gas driven turbine wheel mounted on a rotatable shaft within a turbine housing. Rotation of the turbine wheel rotates a compressor wheel mounted on the other end of the shaft within a compressor housing. The compressor wheel delivers compressed air to the intake manifold of the engine, thereby increasing engine power.

The turbocharger shaft is supported by a central bearing housing disposed between the turbine and compressor wheels. The turbocharger shaft rotates within a bearing cartridge housed in an axial bore of the bearing housing.

The turbocharger shaft is conventionally supported for rotation in a bearing housing by a bearing assembly comprising inner and outer races radially separated by bearing elements, the bearing housing having a bore through which the shaft extends.

Lubricating fluid, in the form of oil, is fed to the bearing assembly under pressure from the oil system of the engine via an oil inlet, gallery and passages. Typically, an outer surface of the outer race has shallow annular recesses for receipt of the lubricating oil, which provide annular clearances between the inner surface of the bearing housing and the outer surface of the outer race. The recesses provide a thin film of oil between the outer race and the bearing housing. The film acts as a squeeze film damper and damps rotary motion and vibration caused by rotation of the shaft. From the recesses, the oil flows into the bearing assembly through inlet passages in the outer race. The oil then flows through the bearing assembly, to provide lubrication within the assembly, before passing out of the bearing assembly through an outlet in the outer race to an oil sump. It is important that the outlet is oriented correctly to ensure that the lubricating fluid within the bearing assembly is able to drain under the action of gravity to a lubricating fluid sump.

The inner race of the bearing assembly is fixed to the turbocharger shaft and rotates with the turbocharger shaft. It is necessary for the outer race to be fitted freely within the bearing housing, to allow for assembly, thermal expansion and the squeeze film damping. However, the outer race needs to be constrained to prevent both axial and rotational movement of the outer race. This is necessary to ensure that the outlet in the outer race is oriented correctly to ensure that the lubricating fluid within the bearing assembly is able to drain under the action of gravity to a lubricating fluid sump. This is also necessary to ensure that the inlet passages in the outer race are correctly oriented relative to the bearing housing, so as to allow oil to pass through the inlet passages into the bearing assembly. Correctly orienting the outer race of the bearing assembly, during assembly of the turbocharger, can be problematic. In addition, it can be difficult to maintain the outer race of the bearing assembly in the correct orientation, during operation of the turbocharger.

Typical current designs use a pin that passes from the bearing housing into the outer race, so as to rotationally fix the outer race relative to the bearing housing. However, such an arrangement can be difficult to assemble, requires multiple component parts and accordingly is relatively expensive.

Furthermore, providing an effective sealing system to prevent oil leakage from the central bearing housing into the compressor or turbine housing can be problematic. Oil leakage is regarded as a particular problem at the compressor end of the turbocharger since at low boost pressures (e.g. when the engine is idling or when the turbocharger is operated in engine braking mode) there can be a significant pressure drop from the bearing housing to the compressor housing which encourages oil leakage into the compressor housing. In order to counter such leakage it is known to include an oil slinger as part of a thrust bearing assembly at the compressor end of the bearing housing. An oil slinger is an annular component which rotates with the turbocharger shaft and has surfaces or passages arranged for propelling oil away from the shaft as it rotates, and in particular from the passage through the bearing housing into the compressor housing. Generally an annular splash chamber defined in the bearing housing collects the oil displaced by the slinger, provides for its recirculation and typically allows it to drain to a sump.

Whereas the turbine of a turbocharger drives a compressor, in a power turbine the end of the turbine shaft remote from the turbine wheel transmits power via a mechanical coupling. In a turbocompound engine two turbines are provided in series with a power turbine connected in series with the turbine of a turbocharger. The power turbine is used to generate additional power and a gear wheel may be fixed to the end of the power turbine shaft in order to transmit that power to the crankshaft of the engine via an appropriate coupling (such as for example a fluid coupling or a gear or other drive mechanism), hydraulically, mechanically or electrically. As with a turbocharger, the shaft of a power turbine is supported on bearing assemblies, including appropriate lubricating systems, located within a bearing housing connected to the turbine housing. The bearing arrangement at the turbine end of the shaft may be substantially the same as that found in a turbocharger, although the bearing arrangement at the drive end of the shaft may be a ball bearing assembly.

SUMMARY

One of the objects of the present disclosure, amongst others, is to obviate or mitigate the problems associated with locating an outer race of a bearing assembly in a correct orientation during assembly, with restraining the outer race in a correct orientation during operation and with problems of oil leakage in a turbomachine.

According to a first aspect of the present disclosure there is provided a turbomachine comprising: a shaft rotatable about a rotational axis; a turbine wheel provided at one end of the shaft for rotation about the rotational axis within a turbine housing; the shaft being supported for rotation in a bearing housing by a bearing assembly comprising inner and outer races radially separated by bearing elements, the bearing housing having a bore through which the shaft extends, the bearing assembly being disposed in the bore, wherein the turbomachine further comprises an axial stop member arranged to restrain axial movement of the bearing assembly, a bore is provided in said axial stop member, through which the shaft passes, the bore is defined by a radially inner surface of the axial stop member which forms a close radial fit with the shaft, or a member mounted on the shaft to rotate with the shaft, an anti-rotation formation engageable with a complementary formation provided on the outer race of the bearing assembly so as to rotationally fix the outer race relative to the axial stop member and wherein the axial stop member further comprises a lubricating fluid directing member and a lubricating fluid outlet, the lubricating fluid directing member being arranged to receive lubricating fluid that is flung radially outward from said axis, due to the rotation of the shaft, and to direct the lubricating fluid to the lubricating fluid outlet.

This is advantageous in that the axial stop member is multi-functional. It acts to restrain both axial and rotational movement of the bearing assembly, it acts as a baffle to reduce the amount of lubricating fluid that, for example, needs to be handled by a lubricating fluid slinger and ensures that lubricating fluid is directed to a desired location. Accordingly, the axial stop member replaces multiple components that would otherwise be needed to provide these functions. This results in a saving in cost, complexity, weight and space.

The anti-rotation formation is preferably integrally formed with the axial stop member. This is advantageous in that the disclosure provides a one piece component, with multiple functions, thereby providing a simplified assembly process and therefore lower assembly costs.

Preferably the anti-rotation formation is a lug and the complementary formation is a slot, or vice versa.

Preferably the bearing housing is provided with a formation that is engageable with the anti-rotation formation of the axial stop member so as to rotationally fix the axial stop member relative to the bearing housing. This is advantageous in that it fixes the axial stop member in a desired orientation relative to the bearing housing. In this case, the anti-rotation formation of the axial stop member is engageable with both the complementary formation of the outer race of the bearing assembly and the bearing housing formation.

This is advantageous in that when the anti-rotation formation of the axial stop member is engaged with the complementary formation of the outer race of the bearing assembly and the bearing housing formation, the outer race of the bearing assembly is oriented in a desired orientation relative to the bearing housing. Accordingly, during assembly, the engagement of said formations acts to automatically align the outer race of the bearing assembly in a desired rotational orientation, relative to the bearing housing.

Preferably the bearing housing formation is a slot and the anti-rotation formation is a lug, or vice versa.

Preferably the turbomachine comprises a lubricating sump, the outer race of the bearing assembly is provided with a lubricating fluid outlet and the anti-rotation formation of the axial stop member, the complementary formation of the outer race of the bearing assembly and the bearing housing formation are arranged such that when they are engaged, the lubricating fluid outlet is fluidly connected to the lubricating fluid sump.

This is advantageous in that when said formations are engaged, the outer race of the bearing assembly is automatically oriented such that the lubricating fluid outlet in the outer race is fluidly connected to a lubricating fluid sump. Furthermore, this desired orientation of the outer race bearing assembly is maintained during operation of the turbocharger due to the engagement of said formations.

Preferably the lubricating fluid outlet and the lubricating fluid sump are arranged such that, in this orientation, the lubricating fluid may drain from the bearing assembly, through the lubricating fluid outlet and to the lubricating fluid sump under the action of gravity.

The inner surface of the axial stop member that defines said bore preferably forms a non-contact seal with the shaft, or a member mounted on the shaft to rotate with the shaft. An example of such a member mounted on the shaft to rotate with the shaft is a lubricating fluid slinger. This is advantageous in that the non-contact seal prevents lubricating fluid passing from the bearing assembly through the axial stop member.

Preferably the inner surface of the axial stop member that defines said bore extends substantially around the circumference of the shaft, or a member mounted on the shaft.

The lubricating fluid directing member is preferably integrally formed with the axial stop member. This is advantageous in that the disclosure provides a one piece component, with multiple functions, thereby providing a simplified assembly process and therefore lower assembly costs.

Preferably the lubricating fluid directing member is arranged such that lubricating fluid that is received by the lubricating fluid directing member is directed by the lubricating fluid directing member, under the action of gravity, to the lubricating fluid outlet of the axial stop member. Preferably the anti-rotation formation of the axial stop member, the complimentary formation of the of the outer race of the bearing assembly and the bearing housing formation are arranged such that when they are engaged, the lubricating fluid directing member is oriented such that lubricating fluid that is received by the lubricating fluid directing member is directed by the lubricating fluid directing member, under the action of gravity, to the outlet.

Preferably the lubricating fluid directing member extends from an upper end, in a circumferential direction about the shaft axis to the lubricating fluid outlet. Preferably the lubricating fluid directing member is concavely curved about said shaft axis. Preferably the lubricating fluid directing member substantially encloses a circumferential section of the shaft, or of a member mounted on the shaft to rotate with the shaft.

Preferably the lubricating fluid directing member is radially outwardly spaced from the radially inner wall of the axial stop member that defines said bore. Preferably the lubricating fluid directing member is radially outwardly spaced from the shaft, or a member mounted on the shaft, so as to define a radial clearance between the lubricating fluid directing member and the shaft, or a member mounted on the shaft to rotate with the shaft. This is advantageous in that allows the lubricating fluid directing member to handle a relatively large volume of lubricating fluid.

The lubricating fluid directing member may be formed by one or more surfaces, guide vanes, channels, conduits or the like.

Preferably the lubricating fluid directing member forms a chamber around the shaft, or a member mounted on the shaft, for receiving lubricating fluid that is flung radially outward from said axis, due to the rotation of the shaft, or member.

Preferably at least one wall of the chamber is radially outwardly spaced from the radially inner wall of the axial stop member that defines said bore. This is advantageous in that it provides the chamber with a relatively large volume, thereby allowing the chamber to handle a relatively large volume of lubricating fluid. By way of contrast, if the at least one surface formed a close radial fit with the shaft then the lubricating fluid would be squeezed between the shaft and the at least one surface as it passed along the at least one surface. This would slow the travel of the lubricating fluid along the at least one surface, which could cause the lubricating fluid to back up within the chamber, which could result in leakage of the lubricating fluid from the axial stop member.

Preferably the at least one wall of the chamber is radially outwardly spaced from the shaft, or a member mounted on the shaft to rotate with the shaft, so as to define a radial clearance between the at least one wall and the shaft, or said member.

Preferably the at least one wall of the chamber is concavely curved, with a centre of curvature that is substantially concentric with said axis, and has a radius that is greater than that of the inner wall of the axial stop member that defines said bore.

Preferably the at least one wall of the chamber is a plurality of said walls, i.e. a plurality of walls radially spaced and shaped as stated above.

Preferably the axial stop member comprises a plate. Preferably the plate has a section which protrudes from a surface of the plate and said chamber is formed by said protruding section.

Preferably the turbomachine comprises a lubricating fluid sump and the lubricating fluid outlet of the axial stop member is fluidly connected to the lubricating fluid sump.

Preferably a lubricating fluid slinger is mounted on the shaft, so as to rotate with the shaft, and comprises a slinging formation arranged to propel lubricating fluid away from the shaft as the shaft rotates.

Preferably an area of the turbomachine that surrounds the lubricating fluid slinger is recessed to define a chamber for capturing lubricating fluid that is propelled from the shaft, as the shaft rotates. Preferably the chamber is fluidly connected to a lubricating fluid sump.

Preferably the lubricating fluid slinger is provided with a sealing arrangement to provide a seal between the lubricating fluid slinger and a radially adjacent surface of the turbo machine, within which the lubricating fluid slinger rotates. The sealing arrangement preferably comprises a sealing ring supported on one of a surface of the lubricating fluid slinger or the radially adjacent surface of the turbo machine and an annular groove which receives said sealing ring, provided on the other of the lubricating fluid slinger and said radially adjacent surface.

Preferably the lubricating fluid slinger is mounted on the shaft such that at least a first section of the lubricating fluid slinger is received within the bore of the axial stop member and the radially inner surface of the axial stop member that defines the bore forms a close radial fit with the lubricant fluid slinger. Preferably the close radial fit forms a non-contact seal.

The turbomachine may be a turbocharger comprising a compressor having an impeller wheel mounted on the shaft such that rotation of the turbine wheel causes rotation of the impeller wheel, wherein a compressor back plate is provided between the bearing housing and the impeller wheel, the compressor back plate having an inner surface which defines a bore, through which the shaft passes, a second section of the lubricating fluid slinger is received within the bore and the inner surface that defines said bore forms a close radial fit with the second section of the lubricating fluid slinger.

This is advantageous in that the close radial fit prevents lubricating fluid passing through the compressor back plate and into the compressor housing. The close radial fit preferably forms a non-contact seal.

The above arrangement provides an effective three stage sealing arrangement. At a first stage, the lubricating fluid passing from the bearing assembly is flung radially outward, by the rotating turbocharger shaft, and is received by the oil directing member, which directs the lubricating fluid to a sump, via the lubricating fluid outlet. In addition, the close radial fit of the bore in the axial stop member with the shaft, or a member mounted on the shaft, substantially prevents lubricating fluid from passing through the axial stop member. Accordingly, the majority of the lubricating fluid from the bearing assembly is prevented from passing through the axial stop member and is directed to the lubricating fluid sump. This ensures that lubricating fluid that passes through the axial stop member to the second stage is kept to a minimum. At the second stage, the lubricating fluid slinger acts to fling lubricating fluid radially outward from the shaft, to said lubricating fluid chamber, where it passes to the lubricating fluid sump. At the third stage, the sealing arrangement of the lubricating fluid slinger prevents any remaining lubricating fluid, that passed through the first and second sealing stages, from passing into the compressor housing.

Preferably the turbomachine comprises an abutment member and the bearing assembly is provided between the axial stop member and the abutment member such that the axial stop member restrains axial movement of the bearing assembly in a first axial direction and the abutment member restrains axial movement of the bearing assembly in a second axial direction which is substantially opposite to the first axial direction. Preferably the abutment member is formed by the bearing housing.

The axial stop member preferably abuts the bearing assembly, or an intermediate member provided between the axial stop member and the bearing assembly.

The axial stop member preferably comprises a first surface which mates with a complementary shaped surface of the bearing assembly, or of an intermediate member provided between the axial stop member and the bearing assembly. This is advantageous in that it substantially minimises any freedom of movement of the bearing assembly in the axial direction. Said first surface and said complementary surface are preferably substantially planar.

The bearing elements may be in the form of rollers, ball bearings, etc. Preferably the bearing elements are rolling element bearings. The bearing assembly may comprise a cartridge. The cartridge may form the outer race. The bearing assembly may be an angular contact ball bearing assembly.

According to a second aspect of the disclosure there is provided an internal combustion engine comprising a turbomachine according to the first aspect of the disclosure.

The turbomachine is preferably a turbocharger.

All of the features described herein may be combined with any of the above aspects, in any combination.

BRIEF DESCRIPTION OF THE DRAWINGS

A specific embodiment of the present disclosure will now be described, by way of example only, with reference to the accompanying drawings in which:

FIG. 3 is a rear perspective view of an axial stop member of the turbocharger of FIGS. 1 and 2;

FIG. 4 is a front perspective view of the axial stop member of FIG. 3;

DETAILED DESCRIPTION OF EMBODIMENTS OF THE DISCLOSURE

Figures 1, 2:
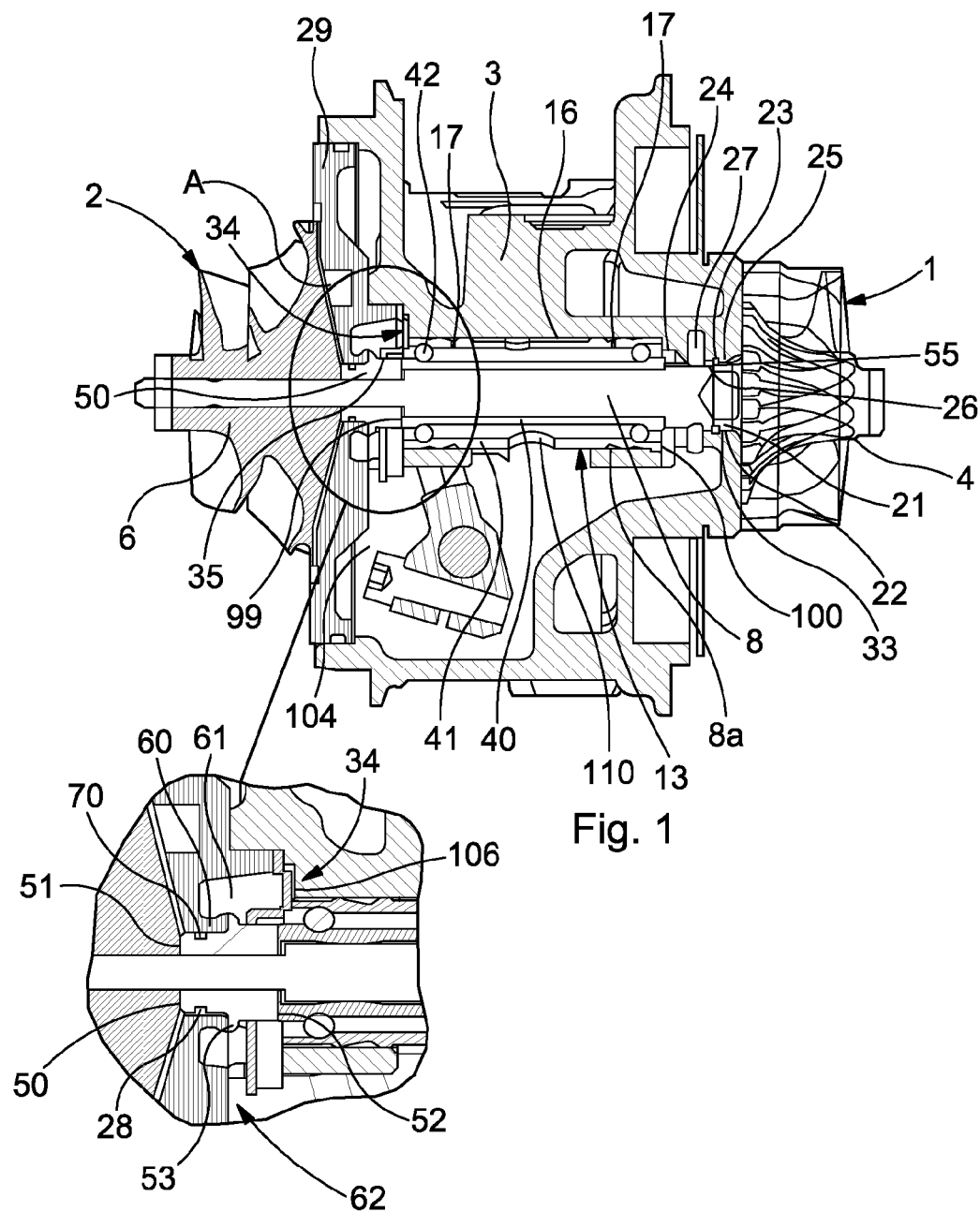
FIG. 1 is a sectioned view along the longitudinal axis of a turbocharger embodying the present disclosure.
FIG. 2 is an enlarged view of section A of FIG. 1.
Figure 6:
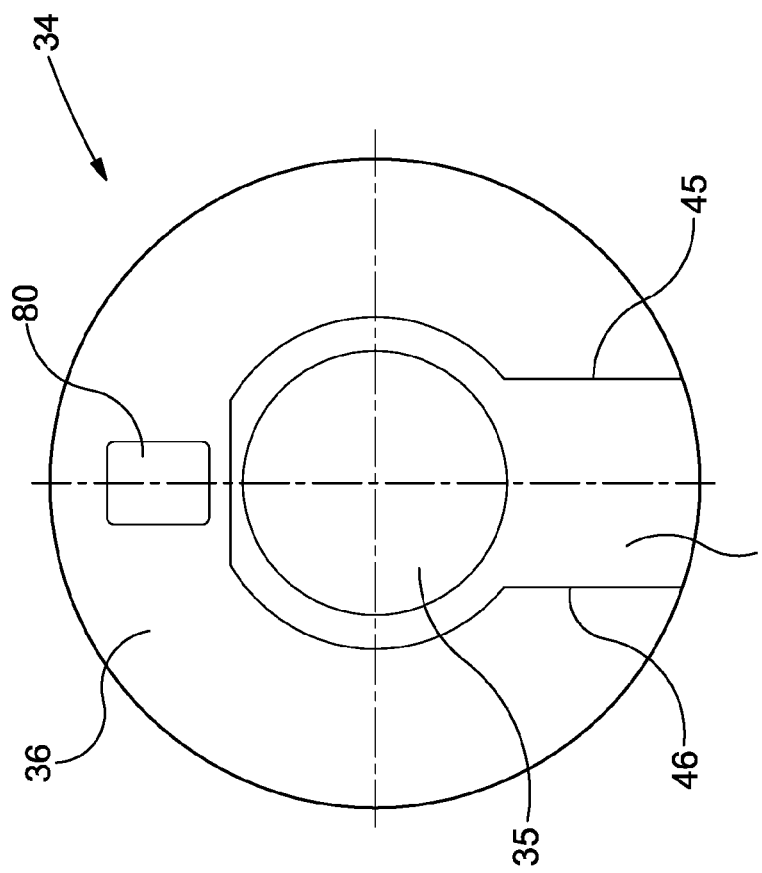
FIG. 6 is a front elevational view of the axial stop plate of FIGS. 3 to 5.
Figure 5:
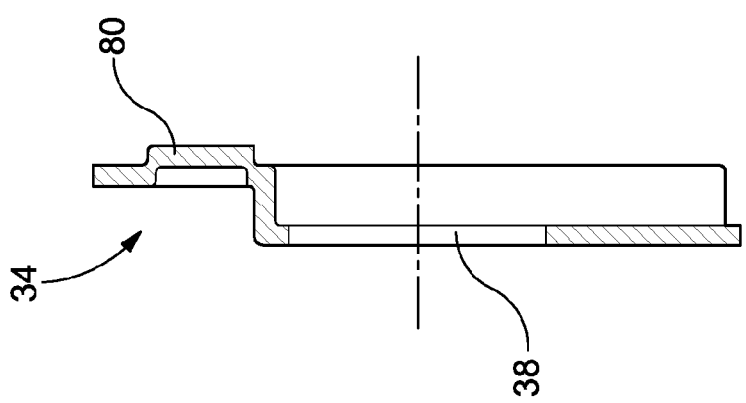
FIG. 5 is a sectioned view along the longitudinal axis of the axial stop member of FIGS. 3 and 4.

Referring now to the drawings, the illustrated turbocharger comprises a turbine 1 connected to a compressor 2 via a central bearing housing 3. The turbine 1 comprises a turbine wheel 4 that rotates within a turbine housing (not shown). Similarly, the compressor 2 comprises a compressor impeller 6 that rotates within a compressor housing (not shown). The turbine wheel 4 and compressor impeller 6 are mounted on opposite ends of a common turbocharger shaft 8 that extends through an axial bore 8*a* defined by an inner surface of the central bearing housing 3. The turbocharger shaft 8 is substantially cylindrical.

In use, the turbine wheel 4 is rotated by exhaust gas from an outlet manifold of an internal combustion engine. The exhaust gas flows from an inlet (not shown), provided in the turbine housing, to an exhaust gas outlet (not shown), also provided in the turbine housing. Rotation of the turbine wheel 4 in turn rotates the compressor impeller 6, which draws intake air through a compressor inlet (not shown), provided in the compressor housing, and delivers boost air to the inlet manifold of the internal combustion engine via an outlet volute (not shown), also provided in the compressor housing.

The shaft 8 is supported for rotation in the central bearing housing 3 by a bearing assembly 13 disposed in the bore 8*a*.

The bearing assembly 13 comprises a cartridge having inner and outer rings that are radially separated by bearing elements 42. The inner and outer rings are axially elongated and have inwardly facing surfaces that define inner and outer races 40, 41 for the bearing elements 42. The inner and outer races 40, 41 have first and second ends 99, 100. In this instance, the bearing elements 42 are in the form of spheres. However, it will be appreciated that other bearing element designs may be used such as, for example, rollers which may be cylindrical, barrel-shaped or tapered.

Lubricating fluid, in the form of, oil is fed to the bearing assembly 13 under pressure from the oil system of the engine via an oil inlet, gallery and passages (not shown). An outer surface of the outer race 41 has a plurality of shallow annular recesses 16 for receipt of the lubricating oil, which provide annular clearances between the inner surface of the bearing housing 3 and the outer surface of the outer race 41 of around 0.03mm or less. The recesses 16 provide a thin film of oil between the outer race 41 of the bearing assembly 13 and the bearing housing 3. The film acts as a squeeze film damper and damps rotary motion and vibration caused by rotation of the shaft 8. From the recesses 16, the oil flows into the bearing assembly 13 through an inlet 17, formed by one or more passages, in the outer race 41. The outer race 41 is also provided with an oil outlet 110, which is fluidly connected to an oil sump 104.

A compressor back plate 29 is mounted between the compressor impeller wheel 6 and the bearing housing 3. The compressor back plate 29 is axially and rotationally fixed relative to the bearing housing 3 and separates the compressor impeller wheel 6 from the bearing housing 3.

A bore 28 extends axially between first and second end faces of the compressor back plate 29. The bore 28 is of substantially circular cross sectional shape, centred on the shaft axis. The bore 28 is defined by a radially inner surface of the compressor back plate 29. The turbocharger shaft 8 passes through the bore 28.

Oil leakage, particularly at the compressor end of the turbocharger, is a problem as at low boost pressures (e.g. when the engine is idling or when the turbocharger is operated in engine braking mode) there can be a significant pressure drop from the bearing housing 3 to the compressor housing which encourages oil leakage through the compressor back plate, into the compressor impeller wheel 6.

A first oil slinger 50 is mounted on the shaft 8 between the compressor wheel 2 and the bearing assembly 13. In use, the first oil slinger 50 rotates with the shaft 8 and acts to propel oil radially outwards from the shaft 8, as it rotates. The first oil slinger 50 is generally annular and extends in an axial direction between first and second ends 51, 52. The first oil slinger 50 is provided with an oil slinging formation in the form of an annular projection 53, which projects from an outer surface of the oil slinger 50, and acts to propel oil away from the shaft 8 as it rotates. The annular projection 53 extends radially outward from an outer surface of the first oil slinger 50 and is disposed approximately half way along the length of the first oil slinger 50.

The first end 51 of the first oil slinger 50 is disposed adjacent to a rear surface of the compressor impeller wheel 6 and the second end 52 of the first oil slinger 50 is disposed adjacent to the first end 99 of the inner and outer races 41, 42 of the bearing assembly 13.

A section of the first oil slinger 50 between the oil slinging formation 53 and the first end 51 of the oil slinger 50 is received within the bore 28 in the compressor back plate 29. The area of the compressor back plate 29 that surrounds the first oil slinger 50 is recessed to define an annular chamber 61. Oil that is flung radially outward from the oil slinger 50 hits the surfaces of the compressor back plate 29 that define the chamber 61 and runs down said surfaces to a drain 62 that is fluidly connected to the oil sump 104. This prevents the oil from entering the compressor housing.

The first oil slinger 50 is provided with a sealing arrangement to provide a seal between the first oil slinger 50 and the radially adjacent inner surface of the compressor back plate 29 that defines the bore 28, in which first oil slinger 50 rotates. The first oil slinger 50 is provided with a substantially annular groove 70, which receives a sealing ring (not shown). The sealing ring is housed within the groove 70 and forms a seal with the radially adjacent inner surface of the compressor back plate 29 that defines the bore 28. Alternatively, in a reciprocal arrangement, the annular groove 70 may be provided in the compressor back plate 29.

The sealing arrangement is provided on the opposite side of the oil slinging formation to the bearing assembly 13, i.e. between the oil slinging formation 53 and the first end 51 of the oil slinger 50.

An annular axial stop plate 34 is provided between the compressor back plate 29 and the bearing housing 3. The axial stop plate 34 is axially fixed relative to the bearing housing 3 by being clamped between opposed surfaces of the compressor back plate 29 and the bearing housing 3. A first end face 36 of the axial stop plate 34 abuts the outer race 41 of the bearing assembly 13 and a second end face 37 of the axial stop plate 34 abuts the compressor back plate 29. The axial stop plate 34 has a radial dimension that extends beyond that of the bearing assembly 13 and bears against a surface of the compressor back plate 29 at its outer periphery. In use, the axial stop plate 34 is designed to resist axial thrust forces exerted on the bearing assembly 13 by the shaft 8.

The outer race 41 of the bearing assembly 13 is received in the bore 8a of the bearing housing 3 between the first end face 36 of the axial stop plate 34 and an annular shoulder 24 formed by a radially inward projecting step on an inner surface of bearing housing 3. The housing of the outer race 41 between the axial stop plate 34 and the annular shoulder 24 axially fixes the outer race 41 relative to the bearing housing 3. Specifically, the axial stop plate 34 restrains axial movement of the outer race 41 of the bearing assembly 13 in a first axial direction and the annular shoulder 24 restrains axial movement of the outer race 41 in a second axial direction which is substantially opposite to the first axial direction.

In the current embodiment, the first end face 36 of the axial stop plate 34 and the annular shoulder 24 of the bearing housing 3 respectively abut the outer race 41 of the bearing assembly 13. However, it will be appreciated, that one or more intermediate members may be provided between the first end face 36 of the axial stop plate 34 and the outer race 41 and/or between the annular shoulder 24 and the outer race 41.

The first end face 36 of the axial stop plate 34 is substantially planar and mates with the first end 99 of the outer race 41 of the bearing assembly 13, which is also substantially planar. This is advantageous in that it substantially minimises any freedom of movement of the outer race 41 of the bearing assembly 13 in the axial direction.

A bore 35 extends axially between the first and second end faces 36, 37 of the plate 34. The bore 35 is of substantially circular cross sectional shape, centred on the shaft axis. The bore 35 is defined by a radially inner surface 38 of the axial stop plate 34.

The turbocharger shaft 8 passes through the bore 35. The bore 35 is sized and dimensioned for receipt of the first oil slinger 50. Specifically, a section of the first oil slinger 50 between the oil slinging formation 53 and the second end 52 of the oil slinger 50 is received within the bore 35.

The second end face 37 of the plate 34 is provided with a protruding section 90, which protrudes away from the second end face 37 in the axial direction. The bore 35 is provided in said protruding section 90 and is defined by an inner surface 38 of the protruding section 90. The inner surface 38 provides an annular sealing surface that forms a close radial fit with the outer surface of the first oil slinger 50, so as to provide a non-contact seal. Accordingly, the axial stop plate 34 acts to prevent oil from passing from the bearing assembly 13, through the axial stop plate 34.

The protruding section 90 comprises an annular recess 71, which effectively enlarges the bore 35 in the radial direction. The recess 71 does not extend across the full axial extent of the plate 34 thus leaving a narrow annular land 70 on the inner periphery of the protruding section 90.

The recess 71 defines a chamber 31 that extends in the circumferential direction around a circumferential section of the first oil slinger 50. The chamber 31 is for receiving oil that is flung radially outward from the turbocharger shaft 8, or from the first oil slinger 50, as it rotates. The chamber 31 is fluidly connected to the oil sump 104.

The chamber 31 is bounded by first and second side walls 42, 43. The first and second side walls 42, 43 are concavely curved and extend in a circumferential direction around the oil slinger 50 from respective upper ends to respective lower ends. The first and second side walls 42, 43 have a centre of curvature that is substantially concentric with the turbocharger axis.

Upper and lower ends of the first and second side walls 42, 43 are spaced apart in the circumferential direction. The upper ends of the first and second side walls 42, 43 are joined by a substantially straight upper wall 44, which is substantially horizontal.

The lower ends of the side walls 42, 43 are fluidly connected by a channel 47 to an outlet 105 provided in a lower peripheral edge of the axial stop plate 34. The channel 47 is formed by opposed and substantially parallel channel walls 45, 46. The channel walls 45, 46 are extensions of the first and second side walls 42, 43 respectively and extend substantially vertically downwards from the lower ends of the first and second side walls 42, 43 respectively, to the outlet 105. The outlet 105 is fluidly connected to the oil sump 104.

The side walls 42, 43 and the upper wall 44 extend from a first of the channel walls 45 to a second of the channel walls 46, in the circumferential direction, so as to substantially enclose a circumferential section of the first oil slinger 50.

The side walls 42, 43, upper wall 44 and channel walls 45, 46 each form oil directing members. They are arranged such oil that is flung radially outward from the turbocharger shaft 8, or from the first oil slinger 50, as it rotates impinges against the respective oil directing member and is directed downwardly along the side walls 42, 43, or off the upper wall 44, through the channel 47, under the action of gravity, to the outlet 105.

The first and second side walls 42, 43 and the upper wall 44 of the chamber 31 are radially outwardly spaced from the inner wall 38 of the axial stop member 34 that defines said bore 35 so as to define a radial clearance between the respective surface and the first oil slinger 50. This is advantageous in that it provides the chamber 31 with a relatively large volume, thereby allowing the chamber 31 to handle a relatively large volume of oil. By way of contrast, if the surfaces 42, 43, 44 formed a close radial fit with the first oil slinger 50 then the oil would be squeezed between the shaft 8 and the respective surfaces. This would slow the travel of the oil along the surfaces, which could cause the oil to back up within the chamber 31, which could result in leakage of the oil from the axial stop plate 34.

The oil directing members are integrally formed with the axial stop plate 34. This is advantageous in that the axial stop plate 34 provides a one piece component that acts to restrain both axial movement of the bearing assembly 13 as well as acting as a baffle to ensure that lubricating oil is directed to a desired location.

The axial stop plate 34 is also rotationally fixed relative to the bearing housing 3. The axial stop plate 34 further comprises an anti-rotation formation in the form of a lug 80 that projects in the axial direction from the first end face 36 of the axial stop plate 34. The lug 80 has a generally rectangular cross sectional shape.

The bearing housing 3 is provided with a formation in the form of a generally rectangular slot 106 (which is shown in cross section in FIG. 2) that is engageable with the lug 80 of the axial stop plate 34 so as to so as to rotationally fix the axial stop plate 34 relative to the bearing housing 3. This is advantageous in that it fixes the axial stop plate 34 in a desired orientation relative to the bearing housing 3.

In a reciprocal arrangement, the axial stop plate 34 may be provided with a slot and the bearing housing 3 provided with a lug. In addition, although in the current embodiment the cooperating formations are a lug and slots, it will be appreciated that any suitable cooperating formations may be used.

The outlet 105 in the axial stop plate 34, the lug 80 of the axial stop plate 34 and the slot 106 in the bearing housing 3 are arranged such that when the lug 80 is engaged with said slot 106, the outlet 105 in the axial stop plate 34 is oriented such that its oil outlet 105 is fluidly connected to the oil sump 104. In addition, the channel 47 is oriented downwardly, such that oil received within the chamber 31 is directed downwardly, under the action of gravity, to the outlet 105.

This is advantageous in that, during assembly, the engagement of the lug 80 and slot 106 acts to automatically align the axial stop plate 34 in a desired rotational orientation relative to the bearing housing 3, so as to allow the gravity drain of oil to the oil sump 104. This therefore makes the assembly process easier, quicker and less prone to errors.

Furthermore, this desired orientation of the axial stop plate 34 is maintained during operation of the turbocharger due to the engagement of the lug 80 and slot 106.

Figure 7:
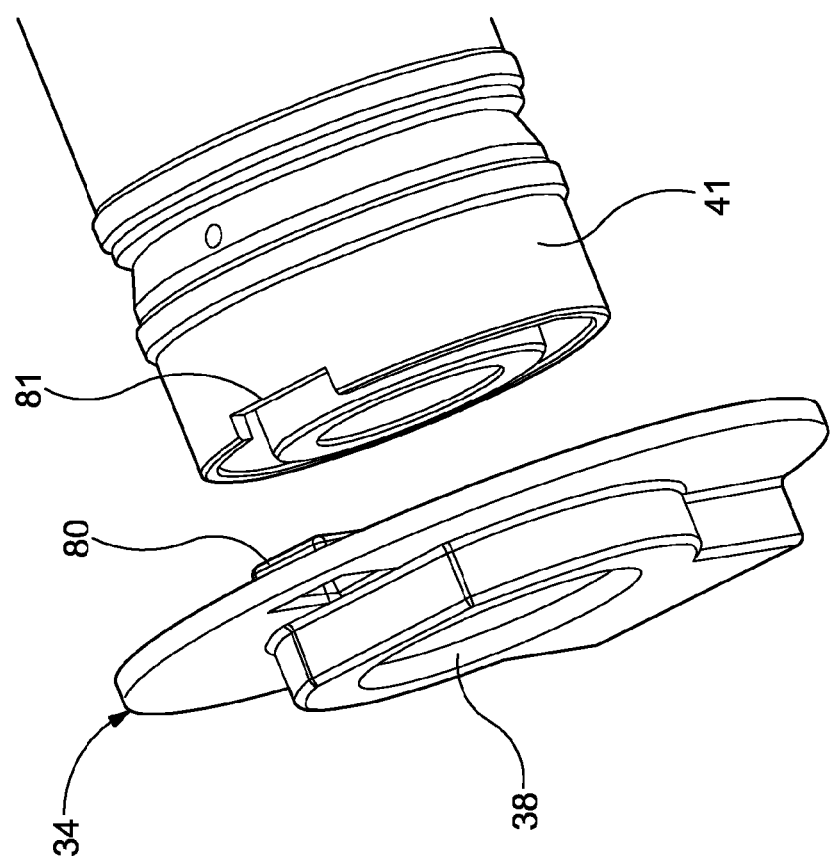
FIG. 7 is an exploded rear perspective view of the axial stop member and a bearing assembly of the turbocharger shown in FIGS. 1 and 2.

The outer race 41 of the bearing assembly 13 is provided with a complementary formation in the form of a slot 81 (see FIG. 7). The lug 80 is engageable with the slot 81 so as to rotationally fix the outer race relative to the axial stop plate 34.

The lug 80 of the axial stop plate 34 is engageable with both the slot 81 of the outer race 41 of the bearing assembly 13 and the slot 106 in the bearing housing 3. Accordingly, when the lug 80 is engaged with both the slot 81 of the outer race 41 of the bearing assembly 13, the outer race 41 of the bearing assembly 13 is fixed in a certain, desired, orientation relative to the bearing housing 3.

Specifically, the outlet 110 in the outer race 41, the lug 80 of the axial stop plate 34 and the slots 81, 106 in the outer race 41 and bearing housing 3 are arranged such that when the lug 80 is engaged with said slots 81, 106, the outlet 110 in the outer race is oriented such that it is fluidly connected to the oil sump 104 such that oil can drain from the bearing assembly 13 under the action of gravity to the sump 104.

This is advantageous in that, during assembly, the engagement of the lug 80 and slots 81, 106 acts to automatically align the outer race 41 of the bearing assembly 13 in a desired rotational orientation relative to the bearing housing 3, so as to allow the gravity drain of oil to the oil sump 104. This therefore makes the assembly process easier, quicker and less prone to errors.

Furthermore, this desired orientation of the outer race 41 of the bearing assembly is maintained during operation of the turbocharger due to the engagement of the lug 80 and slots 81, 106.

In a reciprocal arrangement, the axial stop plate 34 may be provided with a slot 81 and the outer race 41 of the bearing assembly 13 provided with the lug 80.

The lug 80 is integrally formed with the axial stop plate 34. This is advantageous in that the axial stop plate 34 provides a one piece component that acts to restrain both axial and rotational movement of the bearing assembly 13.

The above arrangement provides an effective three stage sealing arrangement. At a first stage, the lubricating oil passing from the bearing assembly 13 is flung radially outward, by the rotating turbocharger shaft 8, and is received within the chamber 31 of the axial stop plate 34. The oil directing members that form the walls of the chamber 31 direct the lubricating oil to the sump 104, via the outlet 105 in the axial stop plate 34. In addition, the close radial fit of the inner wall 38 that defines the bore 35 in the axial stop plate 34, with the first oil slinger 50 substantially prevents oil from passing through the axial stop plate 34. Accordingly, the majority of the lubricating oil from the bearing assembly 13 is prevented from passing through the axial stop plate 34 and is directed to the lubricating fluid sump 104. This ensures that lubricating oil that passes through the axial stop plate 34 to the second stage is kept to a minimum.

At a second stage, the first oil slinger 50 acts to fling lubricating oil radially outward from the shaft 8, to said annular chamber 61, where it passes to the lubricating fluid sump 104.

At a third stage, the sealing arrangement of the first oil slinger 50 substantially prevents any remaining lubricating oil, that passed through the first and second sealing stages, from passing into through the compressor back plate 29 and into the compressor impeller wheel 6.

At the turbine end of the shaft 8, the turbine wheel 4 is connected to the turbocharger shaft 8 at an integrally formed seal boss 21, which extends through a turbine end 22 of the bore 8a. The boss 21 has a larger diameter than that of the remainder of the shaft 8, forming a shoulder 55 that projects radially outward from the remainder of the shaft 8.

The boss 21 is sealed with respect to the bore 8a by means of a piston ring 23 and groove combination. The piston ring 23 is supported by an annular wall 33 that defines the turbine end of the bore 8a. The piston ring 23 extends radially inwards into an annular groove 25 defined in the outer surface of the boss 21 so as to provide a seal.

Axially in-board of the groove 25 the outer surface of the boss 21 has a recessed profile to define a second oil slinger 26. The second oil slinger 26 rotates with the turbocharger shaft 8 and its recessed outer surface is arranged to propel oil away from the shaft 8 as it rotates, in particular to prevent the oil from passing through the bearing housing 3 and into the turbine housing. The area of the bearing housing 3 that surrounds the second oil slinger 26 is recessed to define an annular chamber 27 that captures the dispersed oil and includes a drain.

In light of the above, it can be seen that the axial stop plate 34 is advantageous in that it provides a one piece component that is multi-functional. It acts to restrain both axial and rotational movement of the bearing assembly 13, it acts as a baffle to reduce the amount of lubricating oil that needs to be handled by an oil slinger and ensures that oil is directed to a desired location, i.e. to a sump 104. Accordingly, the axial stop plate 34 replaces multiple components that would otherwise be needed to provide these functions. This results in a saving in cost, complexity, weight and space.

Furthermore, during assembly, the axial stop plate 34 provides a means of automatically orienting the outer race 41 of the bearing assembly 13 in a desired rotational orientation, relative to the bearing housing 3, so that the outlet 105 is fluidly connected to the oil sump 104. This therefore makes the assembly process easier, quicker and less prone to errors.

Furthermore, this desired orientation of the outer race 41 of the bearing assembly is maintained during operation of the turbocharger due to the engagement of the lug 80 and slots 81, 106.

It will be appreciated that numerous modifications to the above described design may be made without departing from the scope of the disclosure as defined in the appended claims.

For example, in the current embodiment, the oil directing members 42, 43, 44 45, 46 of the axial stop plate 34 form a chamber 31 that extends in the circumferential direction around the first oil slinger 50, for receipt of oil flung radially outwardly from the rotating shaft 8, or from a member 50 mounted on the shaft 8 for rotation with the shaft 8. However, it will be appreciated that the axial stop plate 34 may comprise any suitable arrangement of one or more oil directing members that are arranged to received oil flung radially outwardly from the rotating shaft 8, or from a member 50 mounted on the shaft 8 for rotation with the shaft 8, and to direct the received oil to the oil outlet 105. Accordingly, the above disclosure is not limited to where the oil directing member(s) form a chamber around the shaft, or a member 50 mounted on the shaft 8 for rotation with the shaft 8. For example, the lubricating fluid directing member(s) may be formed by one or more surfaces, guide vanes, channels, conduits or the like.

In the described embodiment, the first oil slinger 50 is received within the bore 35 in the axial stop plate 34. However, it will be appreciated that, where an oil slinger 50, or other member, is not received within the bore 35, the bore 35 may form a close radial fit directly with the turbocharger shaft 8, so as to provide a non-contact seal directly with the shaft 8. In this case, the chamber 31 substantially encloses a circumferential section of the shaft 8. The first and second side walls 42, 43 and the upper wall 44 of the chamber 31 are radially outwardly spaced from the inner wall 38 that defines said bore 35 so as to define a radial clearance between the respective surfaces and the shaft 8.

Alternatively, the bore 35 may form a close radial fit with any other member mounted on a shaft, for rotation with the shaft.

In the described embodiment, the lubricating fluid used in the turbocharger is oil. However, it will be appreciated that any suitable lubricating fluid may be used, with the first oil slinger 50 adapted for use with such a lubricating fluid.

The described and illustrated embodiments are to be considered as illustrative and not restrictive in character, it being understood that only the preferred embodiments have been shown and described and that all changes and modifications that come within the scope of the disclosures as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the disclosure as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

The invention claimed is:

1. A turbomachine comprising: a shaft rotatable about a rotational axis; a turbine wheel provided at one end of the shaft for rotation about the rotational axis within a turbine housing; the shaft being supported for rotation in a bearing housing by a bearing assembly comprising inner and outer races radially separated by bearing elements, the bearing housing having a bore through which the shaft extends, the bearing assembly being disposed in the bore, wherein the turbomachine further comprises an axial stop member arranged to restrain axial movement of the bearing assembly, a bore is provided in said axial stop member, through which the shaft passes, the bore is defined by a radially inner surface of the axial stop member which forms a close radial fit with the shaft, or a member mounted on the shaft to rotate with the shaft, an anti-rotation formation formed on the axial stop member and engageable with a complementary formation provided on the outer race of the bearing assembly so as to rotationally fix the outer race relative to the axial stop member and wherein the axial stop member further comprises a lubricating fluid directing member and a lubricating fluid outlet, the lubricating fluid directing member being arranged to receive lubricating fluid that is flung radially outward from said axis, due to the rotation of the shaft, and to direct the lubricating fluid to the lubricating fluid outlet.

2. A turbomachine according to claim 1 wherein the anti-rotation formation is integrally formed with the axial stop member.

3. The turbomachine according to claim 1 wherein the anti-rotation formation is a lug and the complementary formation is a slot, or vice versa.

4. The turbomachine according to claim 1 wherein the bearing housing is provided with a formation that is engageable with the anti-rotation formation of the axial stop member so as to rotationally fix the axial stop member relative to the bearing housing.

5. The turbomachine according to claim 4 wherein the turbomachine comprises a lubricating sump, the outer race of the bearing assembly is provided with a second lubricating fluid outlet and the anti-rotation formation of the axial stop member, the complementary formation of the outer race of the bearing assembly and the bearing housing formation are arranged such that when they are engaged, the second lubricating fluid outlet is fluidly connected to the lubricating fluid sump.

6. The turbomachine according to claim 1 wherein the lubricating fluid directing member is integrally formed with the axial stop member.

7. The turbomachine according to claim 1 wherein the lubricating fluid directing member is radially outwardly spaced from the radially inner wall of the axial stop member that defines said bore.

8. The turbomachine according to claim 1 wherein the lubricating fluid directing member is radially outwardly spaced from the shaft, or a member mounted on the shaft, so as to define a radial clearance between the lubricating fluid directing member and the shaft, or a member mounted on the shaft to rotate with the shaft.

9. The turbomachine according to claim 1 wherein the lubricating fluid directing member forms a chamber around the shaft, or a member mounted on the shaft to rotate with the shaft, for receiving lubricating fluid that is flung radially outward from said axis, due to the rotation of the shaft, or member.

10. The turbomachine according to claim 1 wherein at least one wall of the chamber is radially outwardly spaced from the radially inner wall of the axial stop member that defines said bore.

11. The turbomachine according to claim 1 wherein the at least one wall of the chamber is radially outwardly spaced from the shaft, or a member mounted on the shaft to rotate with the shaft, so as to define a radial clearance between the at least one wall and the shaft, or said member.

12. The turbomachine according to claim 1 wherein the axial stop member comprises a plate and wherein the plate has a section which protrudes from a surface of the plate and said chamber is formed by said protruding section.

13. The turbomachine according to claim 1 wherein the turbomachine comprises a lubricating fluid sump and the lubricating fluid outlet of the axial stop member is fluidly connected to the lubricating fluid sump.

14. The turbomachine according to claim 1 wherein a lubricating fluid slinger is mounted on the shaft, so as to rotate with the shaft, and comprises a slinging formation arranged to propel lubricating fluid away from the shaft as the shaft rotates.

15. The turbomachine according to claim 14 wherein an area of the turbomachine that surrounds the lubricating fluid slinger is recessed to define a chamber for capturing lubricating fluid that is propelled from the shaft, as the shaft rotates.

16. The turbomachine according to claim 14 wherein the lubricating fluid slinger is provided with a sealing arrangement to provide a seal between the lubricating fluid slinger and a radially adjacent surface of the turbo machine, within which the lubricating fluid slinger rotates.

17. The turbomachine according to claim 14 wherein the lubricating fluid slinger is mounted on the shaft such that a first section of the lubricating fluid slinger is received within the bore of the axial stop member and the radially inner surface of the axial stop member that defines the bore forms a close radial fit with the lubricant fluid slinger.

18. The turbomachine according to claim 17 wherein the turbomachine comprises a compressor having an impeller wheel mounted on the shaft such that rotation of the turbine wheel causes rotation of the impeller wheel, wherein a compressor back plate is provided between the bearing housing and the impeller wheel, the compressor back plate having an inner surface which defines a bore, through which the shaft passes, a second section of the lubricating fluid slinger is received within the bore and the inner surface that defines said bore forms a close radial fit with the second section of the lubricating fluid slinger.

19. The turbomachine according to claim 1 wherein the axial stop member comprises a first surface which mates with a complimentary shaped surface of the bearing assembly, or of an intermediate member provided between the axial stop member and the bearing assembly.

20. An internal combustion engine comprising the turbomachine according to claim 1.

* * * * *